United States Patent
Centofanti

[15] 3,679,155
[45] July 25, 1972

[54] BALLOON AND PARACHUTE COMBINATION

[72] Inventor: Armando P. Centofanti, 2812 Newbern Circle, Youngstown, Ohio 44502

[22] Filed: Aug. 28, 1970

[21] Appl. No.: 67,834

[52] U.S. Cl. ............................................................244/32
[51] Int. Cl. ......................................................B64b 1/48
[58] Field of Search .................................244/32, 142, 149

[56] References Cited

UNITED STATES PATENTS

| | | | |
|---|---|---|---|
| 1,569,391 | 1/1926 | Pearl et al. | 244/32 |
| 981,655 | 1/1911 | Keller | 244/32 |
| 496,854 | 5/1893 | Capazza | 244/32 |
| 3,228,633 | 1/1966 | Fisher | 244/31 |
| 3,565,368 | 2/1971 | Byron | 244/31 |

Primary Examiner—George E. A. Halvosa
Attorney—Webster B. Harpman

[57] ABSTRACT

A balloon and parachute combination wherein the parachute is positioned over and around the balloon with the space therebetween being progressively smaller from the sides of the balloon and parachute to the top of the balloon and parachute.

5 Claims, 1 Drawing Figure

PATENTED JUL 25 1972      3,679,155
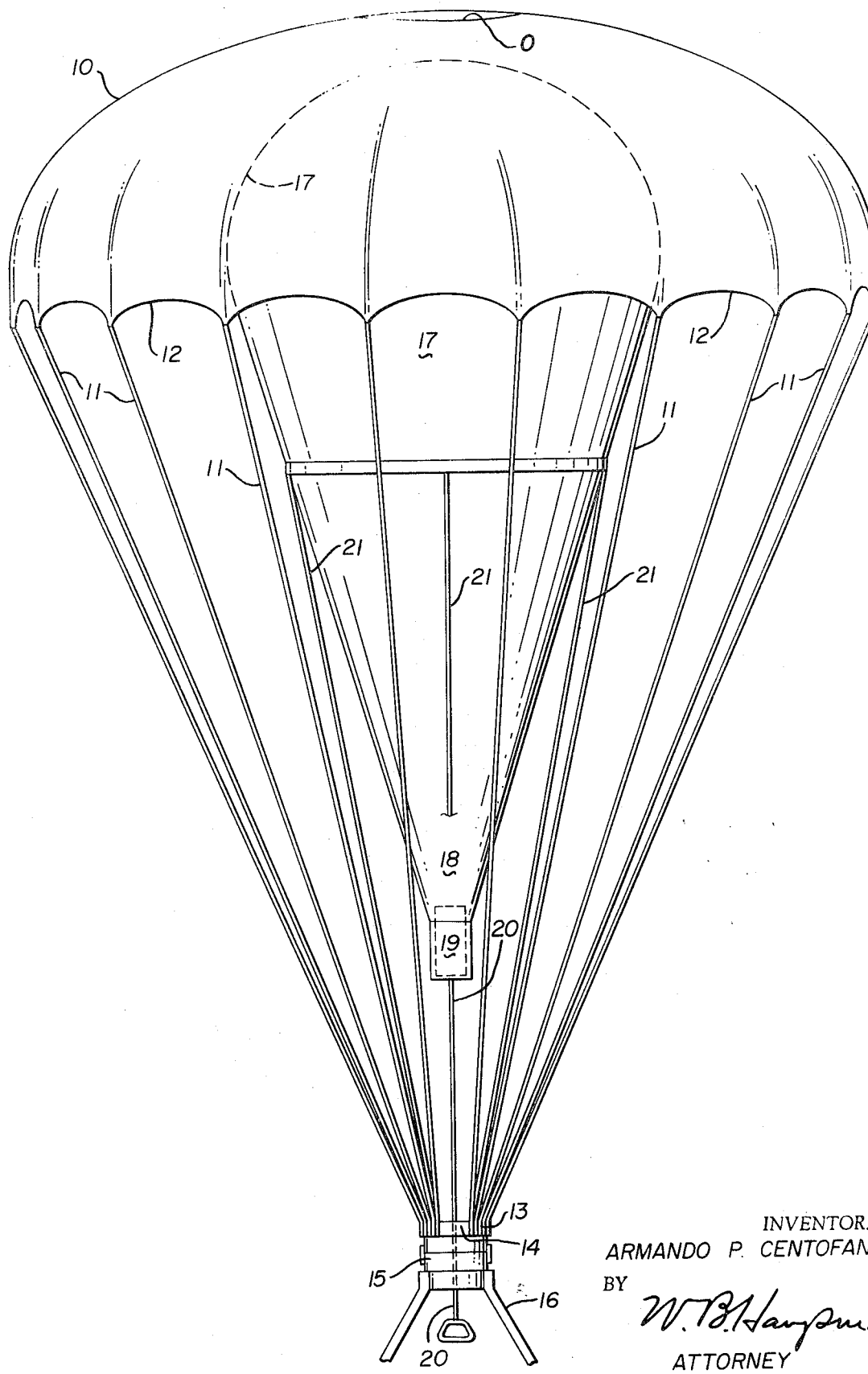
INVENTOR.
ARMANDO P. CENTOFANTI
BY
*W.B. Hauptman*
ATTORNEY

BALLOON AND PARACHUTE COMBINATION

BACKGROUND OF THE INVENTION:

1. Field of the Invention

This invention relates to parachute structures of the type normally employed to lower a person or object through the air to the earth.

2. Description of the Prior Art

Combinations of balloons and parachutes have been heretofore proposed wherein the parachute is used to insure the safe descent of the person or object originally supported by the balloon. In U.S. Pat. No. 496,854 the balloon is largely deflated during descent. In U.S. Pat. No. 3,154,268 a two-part balloon is disclosed, an upper portion of which becomes detached and the lower portion of which turns inside out when the balloon deflates and becomes a parachute.

Other patents have proposed to shape parachutes in the form of balloons see U.S. Pat. Nos. 3,458,161 and 3,473,763.

No prior art is known wherein a fully inflated balloon is positioned within an operative fully expanded parachute to create a novel restricted air passageway therebetween. This invention provides a structure that slows down the rate of descent of a person or object supported thereby.

SUMMARY OF THE INVENTION

A balloon and parachute combination comprises a parachute of the usual configuration and size having a balloon of approximately half the diameter of the parachute disposed within the parachute with the upper portion of the balloon spaced relatively closer to the top of the parachute than the side portions thereof to form a restricted air passageway about the balloon and within the parachute.

In use, the balloon is inflated at the time the parachute opens as from the actuation of a compressed gas cartridge supplying helium or hydrogen in an amount sufficient to inflate the balloon.

DESCRIPTION OF THE DRAWING

The FIGURE in the drawing is a side elevation of the balloon and parachute combination with parts of the harness thereof broken away.

DESCRIPTION OF THE PREFERRED EMBODIMENT

The balloon parachute combination consists of a conventional parachute generally indicated at 10 having an opening 0 in the top thereof and a plurality of cords 11 attached to its peripheral edge 12 and extending away therefrom on converging lines and secured at their opposite ends 13 to a ring 14. A coupling 15 is preferably employed for detachably securing a harness 16 by which a person or object to be supported by a balloon parachute combination may be carried.

A balloon 17 the largest diameter of which is approximately half the diameter of the parachute 10 is positioned largely within the area of the parachute 10 and the depending portion of the balloon 17 tapers inwardly toward an end 18 which is of relatively small diameter and which encloses a compressed gas cartridge 19. An opening device on the compressed gas cartridge 19 is arranged to be actuated by a pull cord 20 the other end of which extends to a point adjacent the harness 16 heretofore referred to.

A plurality of secondary cords 21 are attached to the balloon as will be understood by those skilled in the art and extend on a converging path toward the ring 13 heretofore referred to and are attached thereto along with the cords 11 of the parachute. The respective length of the cords 11 and the secondary cords 21 are such that the uppermost part of the balloon 17 is spaced with respect to the uppermost part of the parachute 10 so as to provide an air passageway therebetween and through the opening 0.

The construction of the parachute 10 and the balloon 17 is such that they may be packed into a conventional parachute pack along with the compressed gas cartridge 19.

It will be obvious to those skilled in the art that the compressed gas cartridge may contain compressed helium or compressed hydrogen or the like in an amount sufficient when expanded to inflate the balloon 17.

In operation the balloon and parachute combination is released from the parachute pack (not shown) in the usual manner and simultaneously the pull cord 20 is moved to actuate the release means on the compressed gas cartridge 19. As the parachute 10 opens the balloon 17 inflates and the rate of inflation is such that the balloon 17 is inflated by the time the parachute is opened.

The lift of the balloon slows down the rate of descent and the progressively restricted air passageway between the widest part of the parachute and the widest part of the balloon and the narrower spacing of the parachute and balloon at their uppermost portions results in a still further slowing down of the rate of descent of a person or object supported by the device.

The above described structure provides a very slow rate of descent of a person or object supported thereby and if desired the pull cord 20 which actuates the compressed gas cartridge 19 can be arranged to vent the balloon 17 so that the rate of descent can be accelerated.

Although but one embodiment of the present invention has been illustrated and described, it will be apparent to those skilled in the art that various changes and modifications may be made therein without departing from the spirit of the invention.

I claim:

1. A balloon and parachute combination comprising a parachute having an opening in its top, a plurality of cords attached to the periphery of said parachute and extending in converging relation to a common junction, a balloon disposed within said parachute in spaced relationship thereto over the entire surface of said balloon and defining a restricted annular space between the balloon and parachute to restrict the flow of air between the balloon and parachute and through said opening in said parachute to retard the rate of descent of said balloon and parachute combination, and a plurality of cords attached to said balloon and extending in converging relation to said common junction with said parachute cords.

2. The balloon parachute combination of claim 1 wherein the diameter of the balloon is approximately one half the diameter of the parachute.

3. The balloon parachute combination of claim 1 wherein the upper portion of the balloon is round and the lower portion thereof is conical.

4. The balloon and parachute combination of claim 1 wherein the upper portion of the balloon is round and the lower portion is conical and the upper portion is within the area of the parachute.

5. The balloon and parachute combination of claim 1 wherein the upper portion of the balloon is round and the lower portion is conical and the upper portion is within the area of the parachute and wherein the uppermost portion of the balloon is closely spaced with respect to the uppermost portion of the parachute and the portion of the balloon having the widest diameter is spaced from the parachute a substantially greater distance.

* * * * *